C. ESCALANTE & J. P. SIRGADO.
VEHICLE.
APPLICATION FILED JAN. 6, 1910.
988,181.
Patented Mar. 28, 1911.
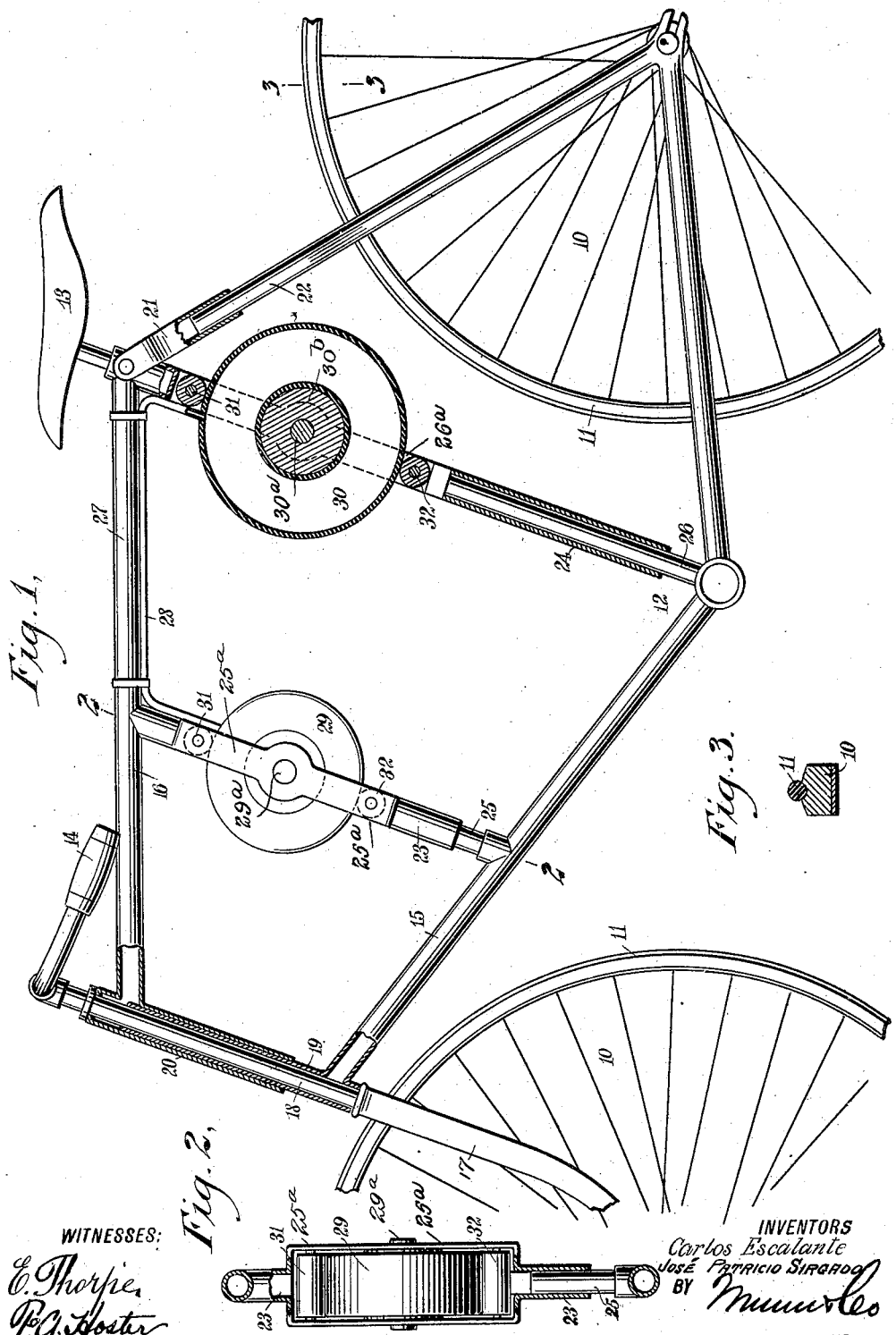
INVENTORS
Carlos Escalante
José Patricio Sirgado

UNITED STATES PATENT OFFICE.

CARLOS ESCALANTE AND JOSÉ PATRICIO SIRGADO, OF MÉRIDA, MEXICO.

VEHICLE.

988,181.  Specification of Letters Patent.  Patented Mar. 28, 1911.

Application filed January 6, 1910. Serial No. 536,624.

*To all whom it may concern:*

Be it known that we, CARLOS ESCALANTE, a citizen of the Republic of Mexico, and JOSÉ PATRICIO SIRGADO, a citizen of the Republic of Cuba, both residing at Mérida, State of Yucatan, Mexico, have invented a new and Improved Vehicle, of which the following is a full, clear, and exact description.

An object of the invention is to provide a vehicle adapted to reduce to a minimum any shock or jar occasioned when operating the vehicle. For the purpose mentioned, a vehicle is provided having the upper portion of the frame cushioned, so that any jar transmitted to the frame when the vehicle is operated, is immediately absorbed by the cushioned means, thus insuring a comfortable seat for an operator mounted on the vehicle.

Reference is to be had to the accompanying figures, constituting a part of this specification in which similar characters of reference denote corresponding parts in all the views and in which—

Figure 1 is a side elevation of our invention as applied to a bicycle with parts in section to disclose the underlying structure; Fig. 2 is a sectional view taken on the line 2—2 in Fig. 1, and Fig. 3 is a sectional view taken on the line 3—3 in Fig. 1.

In the use of vehicles having pneumatic tires, unlimited trouble is experienced by the wear on the tires, the susceptibility of pneumatic tires to punctures and the almost constant supplying of air to the tires to preserve the object for which the pneumatic tire is constructed. In our invention we provide a vehicle having solid tires, preferably of rubber, and adapted to withstand hard usage, and in order to supply a cushion for that portion of the frame of the vehicle, upon which the operator sits, we provide a pneumatic device mounted on the frame so that any shock transmitted to the frame by the wheels of the vehicle, are absorbed by the pneumatic device on the frame.

Referring more particularly to the views, we employ a pair of wheels 10 having solid tires 11 and mounted on the wheels 10 is a frame 12 having a seat 13 and handle bars 14. The frame 12 is preferably composed of two portions 15 and 16, of which the portion 15 is mounted on the wheels 10 and the portion 16 is disposed on the part 15. A front fork 17 of the part 15, has an extension 18 inclosed by a casing 19 of the part 15 and a sleeve 20 of the part 16 is adapted to slidably fit over the casing 19. Likewise a sleeve 21 is pivotally mounted on the part 16 and slidably engages a rear fork 22 of the part 15, and sleeves 23, and 24 of the part 16 slidably engage bars 25 and 26 respectively, of the part 15.

On a cross-bar 27 of the part 16 is secured a tube 28 having its end connected with circular air containing receptacles 29 and 30 mounted on the sleeves 23 and 24, by disposing the said receptacles intermediate roller bearings 31 and 32 the bearings 32 being slidably mounted on the sleeves 23 and 24. The receptacles 29 and 30 are held on the forked parts 25$^a$ and 26$^a$ of the sleeves 23 and 24 by bolts 29$^a$ and 30$^a$ passing through solid central portions 30$^b$ of the receptacles.

From the foregoing description it will be readily seen that when an operator is mounted on the seat 13 and the vehicle is moving over a road, any jar occasioned by the wheels striking a stone or bump will cause the sleeves 20, 21 and 23, 24 of the part 16 to slide on the bars 18, 22, 25 and 26 of the part 15, while the receptacles 29 and 30, being filled with air, take up the shock caused by the wheels 10 striking the stone, as mentioned.

It will be noticed that with the construction described, the pneumatic cushions do not contact with the road over which the vehicle is moving, thereby reducing the wear and tear of the cushions and by connecting the cushions by means of the tube 28, the air pressure in both cushions is at all times equalized.

Having thus described our invention, we claim as new, and desire to secure by Letters Patent:

A vehicle comprising a frame mounted on wheels, bars on the said frame, a second frame mounted on the first frame, sleeves on the second frame and adapted to slidably receive the bars on the said first frame, circular pneumatic cushions mounted on the said sleeves, roller bearings mounted to slide on the sleeves and interposed between the cushions and the said bars and a tubular connection between the said cushions.

Mérida, Yucatan, Mexico, December the second, 1909.

CARLOS ESCALANTE.
JOSÉ PATRICIO SIRGADO.

Witnesses:
　JOSE M. GUENA,
　AFORNANDY MONTILLE.

---

Copies of this patent may be obtained for five cents each, by addressing the "Commissioner of Patents. Washington, D. C."